O. M. RICE.
WEIGHING SCALE.
APPLICATION FILED JULY 1, 1911.
1,033,734.
Patented July 23, 1912.
2 SHEETS—SHEET 1.
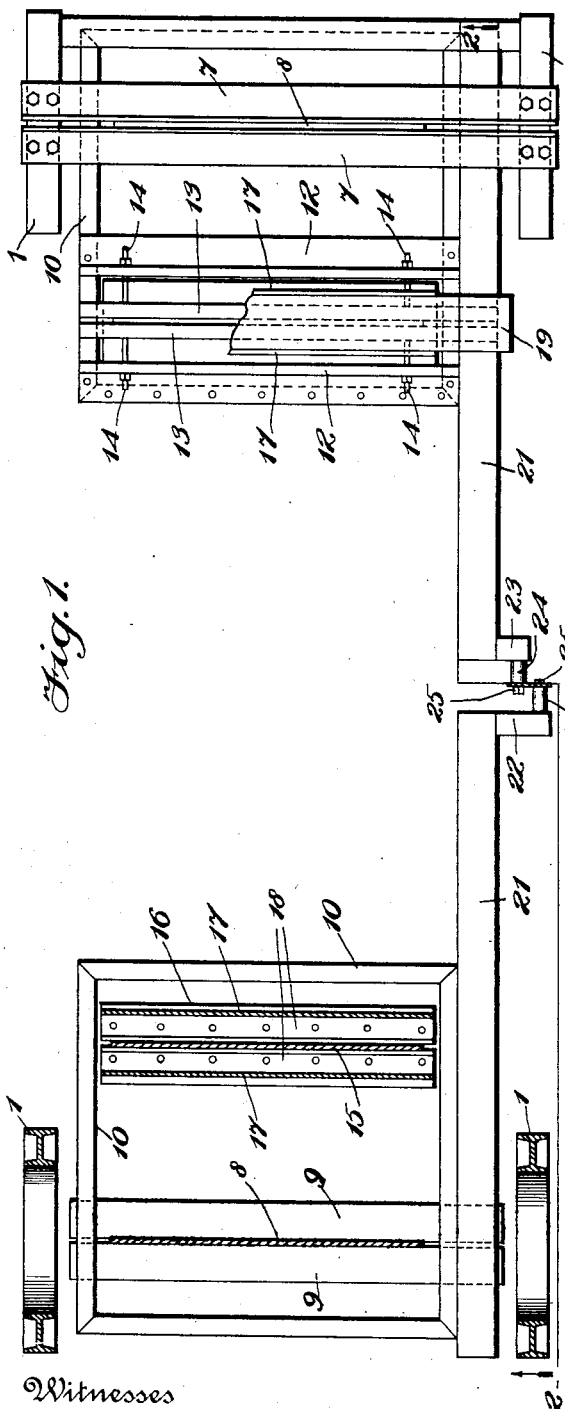
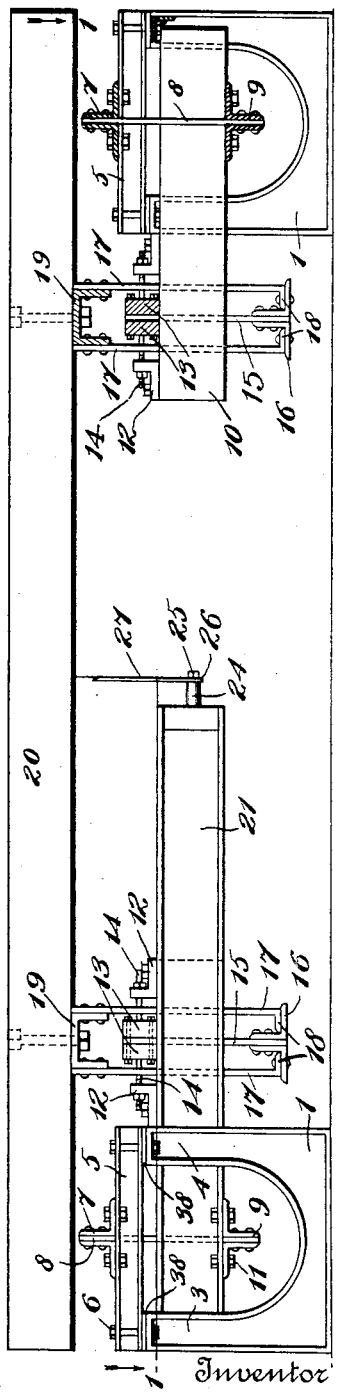
Witnesses
Byron B. Collings.
G. E. Dunstan
Inventor
Oliver M. Rice,
By Wilkinson, Fisher & Witherspoon
His Attorneys
COLUMBIA PLANOGRAPH CO., WASHINGTON, D. C.

O. M. RICE.
WEIGHING SCALE.
APPLICATION FILED JULY 1, 1911.
1,033,734.
Patented July 23, 1912.
2 SHEETS—SHEET 2.
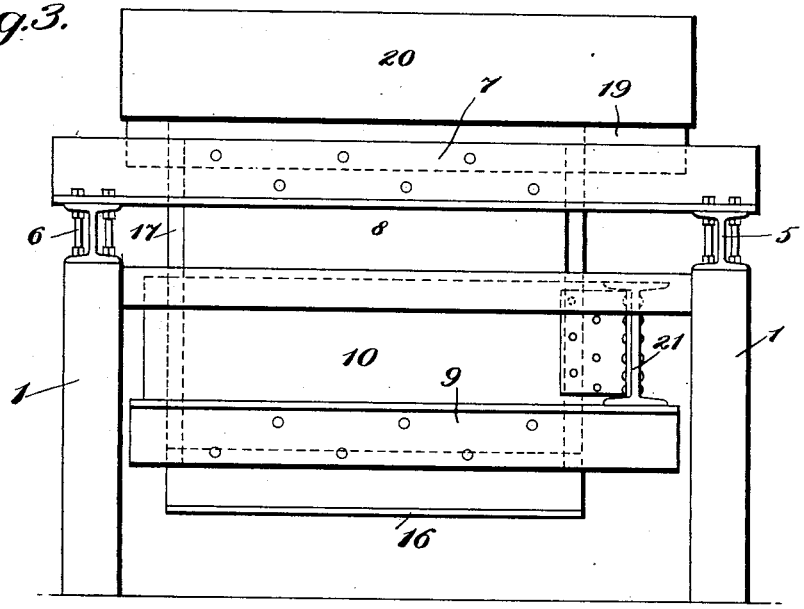
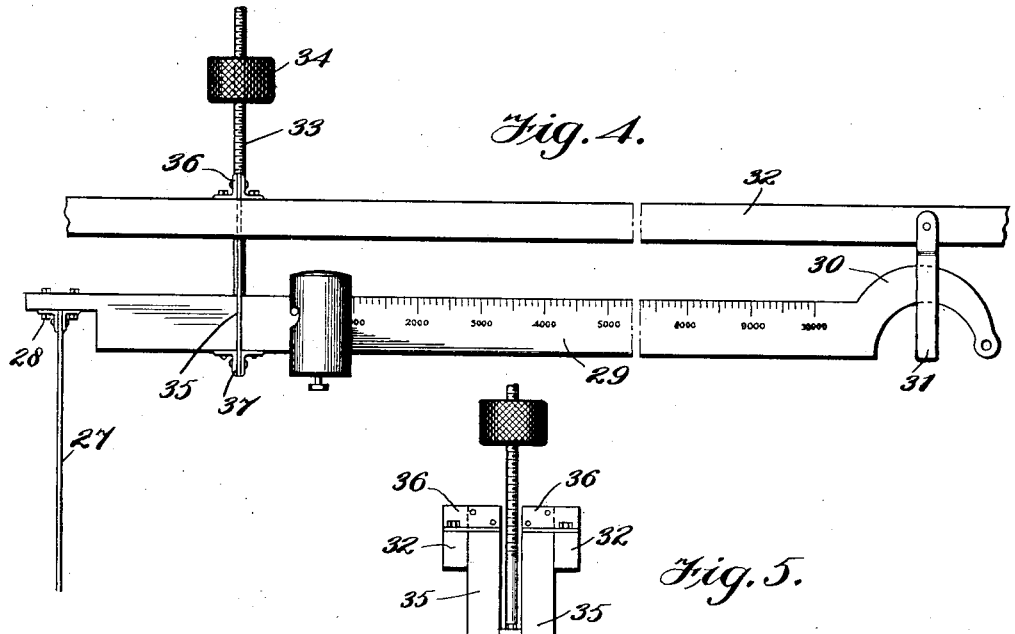
Witnesses
Byron B. Collings
Inventor
Oliver M. Rice,
his Attorneys

UNITED STATES PATENT OFFICE.

OLIVER METCALF RICE, OF NEW ORLEANS, LOUISIANA.

WEIGHING-SCALE.

1,033,734. Specification of Letters Patent. Patented July 23, 1912.

Application filed July 1, 1911. Serial No. 636,544.

*To all whom it may concern:*

Be it known that I, OLIVER M. RICE, a citizen of the United States, residing at New Orleans, in the parish of Orleans and State of Louisiana, have invented certain new and useful Improvements in Weighing-Scales; and I do hereby declare the following to be a full, clear, and exact description of the invention, such as will enable others skilled in the art to which it appertains to make and use the same.

This invention relates to improvements in platform scales and has for its main object to provide means for supporting the platform levers and scale beam to eliminate the usual bearings and pivots and therefore produce a scale of simple and inexpensive construction which will not easily get out of order.

With the above and other objects in view, the invention consists in certain combinations and arrangements of the parts hereinafter described, and the novel features thereof will be particularly pointed out in the claims.

Figure 1 is a section and plan view of a scale embodying my invention taken on line 1—1 of Fig. 2; Fig. 2 is a section and elevational view taken on line 2—2 of Fig. 2; Fig. 3 is an end elevation on an enlarged scale; Fig. 4 is a side view of the scale beam; and Fig. 5 is an end elevation of Fig. 4.

In the drawings, the supporting frame consists of a plurality of U-shaped brackets 1 arranged in pairs, the upwardly projecting legs 3 and 4 of which support short longitudinal beams 5 secured thereto by means of bolts 6. Fastened to the upper side of the beams 5 resting on each pair of brackets is a pair of spaced transversely extending angle bars 7, between each pair of which are secured depending plates 8 of spring steel or other suitable material of a strength for sustaining the load to be weighed.

Fixed to the lower part of the plates 8 at each side thereof are angle bars 9 for carrying rectangular shaped frames 10 which are rigidly attached to the horizontal flanges of said angle bars as at 11.

Extending transversely of the inner portions of the rectangular shaped frames 10 and fastened to the upper sides thereof are spaced angle bars 12, between which are arranged spaced bars 13 movably mounted on the frames and adjustable by means of bolts 14 projecting laterally from said bars and passing through the vertical legs of the angle bars 12. The bars 13 carrying the plates 15 are made adjustable in order to move said plates to a parallel plane with the plates 8 for assuring correct working of the scales. Depending plates 15 similar to the plates 8 are secured between the bars 13, and to their lower portions are fastened transverse angle bars 16 supporting on their horizontal flanges vertical plates 17 having inwardly turned feet 18. Channel lines 19 are fixed between the upper ends of the plate 17 and bolted thereto is a platform 20 for carrying the load to be weighed.

The downward movement of the platform will be transmitted to the rectangular shaped frames 10 which will cause the plates 15 and 8 to springingly yield from a vertical plane, thereby acting as pivots, and said movement will be transmitted to the scale beam hereinafter described.

Rigidly secured to one side of each of the rectangular shaped frames 10 are longitudinally extending levers 21 provided at their adjacent ends with laterally projecting arms 22 and 23, one being longer than the other and carrying bosses 24, to which are suitably connected by means of bolts 25, the legs 26 of a forked member 27 which is attached as at 28 to a scale beam 29.

The scale beam is provided with the usual markings and adjustable balance weight, and has a curved end 30 slidably mounted in a slotted guide 31 depending from suitable fixed supports 32. Projecting upwardly from the scale beam 29 at a point near the attachment of the forked member 27 is a rod 33 carrying an adjustable poise 34 for regulating the movement of the beam. The scale beam is pivotally suspended from the supports 32 by means of a pair of vertical plates 35 of suitable springy material, which are secured between angle bars 36 carried by the supports and angle bars 37 fixed to the plates and scale beam.

By the above described construction it is apparent that a load carried by the platform will cause same to move downwardly and the thin spring plates 15 and 8 will yield from a vertical plane thereby serving the purpose of pivots, and the movement of the platform will be transmitted to the scale beam which will swing as on a pivot by the yielding of the plates 35. The platform may be leveled by interposing blocks 38 between the short longitudinal beams 5 and the legs 3 and 4 of the brackets 1. By adjusting the poise 34 nearer or farther from the scale beam, the leverage is correspondingly lessened or increased as the scale beam rocks, and in this manner the scales may be correctly balanced.

Although the elements set forth and described are well adapted to accomplish the purposes for which they are intended, it is to be understood that slight changes in the details of construction and the arrangement of the parts may be resorted to without sacrificing any of the advantages or departing from the spirit of the invention.

Having fully described my invention, what I claim is:—

1. In a weighing scale, the combination of a platform a plurality of vertical plates held rigidly at one edge, other vertical plates for supporting the platform, means carried by the first named plates for supporting the second named plates, and means for adjusting the second named plates to a parallel plane with the first named plates, substantially as described.

2. In a weighing scale, the combination of a platform, brackets arranged in pairs, a vertical plate depending from each pair of brackets, a frame carried by each plate, an adjustable bar supported by each frame, a vertically arranged plate depending from each bar, and means carried by the lower portion of the plates for supporting the platform, substantially as described.

3. In a weighing scale, the combination of a platform, brackets arranged in pairs, a vertical plate depending from each pair of brackets, a frame carried by each plate, a vertical plate supported by each frame and supporting the platform, a longitudinal lever projecting from each frame, an arm extending laterally from each lever, a forked member secured to the arms, and a scale beam connected to the forked member, substantially as described.

4. In a weighing scale, the combination of a movable supporting platform, a scale beam connected to the platform, a balance weight adjustable on the scale beam, a rod extending vertically from the scale beam, a poise adjustably mounted on the rod, and a vertical plate arranged at each side of the rod for supporting the scale beam to serve the purpose of a pivot, substantially as described.

5. In a weighing scale, the combination of a platform, brackets arranged in pairs, a vertical plate depending from each pair of brackets, a frame carried by each plate, a bar movably supported by each frame, angle bars fixed to each frame and arranged at each side of said bar, and bolts projecting from said bar, and passing through the angle bars for adjusting said bar and securing it in a fixed position, substantially as described.

6. In a weighing scale, the combination of a platform, brackets arranged in pairs, a vertical plate depending from each pair of brackets, a frame carried by each plate, a vertical plate supported by each frame and supporting the platform, a longitudinal lever projecting from each frame, and a scale beam connected to the free ends of the levers, substantially as described.

In testimony whereof, I affix my signature, in presence of witnesses.

OLIVER METCALF RICE.

Witnesses:
J. D. BERTOLI,
W. MORGAN GURLEY,
D. B. H. CHOFFE.

Copies of this patent may be obtained for five cents each, by addressing the "Commissioner of Patents, Washington, D. C."